(12) United States Patent
Kegel

(10) Patent No.: US 9,396,110 B2
(45) Date of Patent: Jul. 19, 2016

(54) NON-VOLATILE HYBRID MEMORY

(71) Applicant: ADVANCED MICRO DEVICES, INC., Sunnyvale, CA (US)

(72) Inventor: Andrew G. Kegel, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 216 days.

(21) Appl. No.: 13/725,177

(22) Filed: Dec. 21, 2012

(65) Prior Publication Data

US 2014/0181361 A1    Jun. 26, 2014

(51) Int. Cl.
*G06F 12/06*     (2006.01)
*G06F 11/07*     (2006.01)
*G06F 11/20*     (2006.01)
*G06F 3/06*      (2006.01)
*G06F 12/08*     (2016.01)

(52) U.S. Cl.
CPC ........ *G06F 12/0638* (2013.01); *G06F 11/0751* (2013.01); *G06F 12/0804* (2013.01); *G06F 3/0679* (2013.01); *G06F 11/2015* (2013.01); *G06F 12/0866* (2013.01)

(58) Field of Classification Search
CPC .............. G06F 12/0866; G06F 3/0679; G06F 11/2015; G06F 11/0751
USPC .............................. 711/103, 118, 159; 714/14
See application file for complete search history.

(56) References Cited

U.S. PATENT DOCUMENTS

| | | | |
|---|---|---|---|
| 5,798,961 A | | 8/1998 | Heyden et al. |
| 8,270,226 B2 | | 9/2012 | Choi et al. |
| 2006/0069870 A1 | * | 3/2006 | Nicholson et al. ............ 711/118 |
| 2013/0067179 A1 | * | 3/2013 | Paleologu et al. ............ 711/159 |
| 2013/0097458 A1 | * | 4/2013 | Sekino et al. ................ 714/6.3 |
| 2014/0082261 A1 | * | 3/2014 | Cohen et al. .................. 711/103 |

* cited by examiner

*Primary Examiner* — Than Nguyen
(74) *Attorney, Agent, or Firm* — Park, Vaughan, Fleming & Dowler LLP

(57) ABSTRACT

Memory units and computer systems are provided. The computer systems include a memory unit. The memory unit includes a stable storage unit, an unstable storage unit, and a controller. The unstable storage unit stores pending write operations for the stable storage unit. The controller is configured to determine the locations in the unstable storage that store the pending write information and to selectively write the pending write operations to the stable storage unit when power to the memory unit is interrupted.

21 Claims, 2 Drawing Sheets

NON-VOLATILE HYBRID MEMORY

TECHNICAL FIELD

The technical field relates generally relates to non-volatile hybrid memory, and more particularly to non-volatile memory with a volatile cache whose write operations are written to the non-volatile memory when main power is interrupted.

BACKGROUND

Several types of non-volatile (NV) memory technologies are being developed to serve as "system memory" in a computer system to replace the common dynamic random access memory (DRAM). The NV memory technologies typically have slow read and write times. To improve the slow read and write times of the NV memory, "hybrid" memories may be employed. In one type of hybrid memory, a large block of NV memory may have a static or dynamic RAM as a buffer/cache. Write operations may be written to and confirmed from the static or dynamic RAM to mask the slow read and write times of the NV memory.

These hybrid memories typically lose the data in the static or dynamic RAM when power is interrupted. Some hybrid memories include a battery backup to copy the entire contents of the static or dynamic RAM to a flash memory when power is interrupted. The battery capacity required to copy the entire contents of the static or dynamic RAM, however, may require undesirably large batteries.

SUMMARY OF EMBODIMENTS

Memory units and computer systems are provided. The computer systems include a memory unit. In some embodiments a memory unit includes a stable storage unit, an unstable storage unit, and a controller. The unstable storage unit stores pending write operations for the stable storage unit. The controller is configured to determine the locations in the unstable storage that store the pending write information and to selectively write the pending write operations to the stable storage unit when power to the memory unit is interrupted.

In some embodiments a memory unit includes a stable storage unit, a volatile cache, a controller, and an energy storage device. The volatile cache stores pending write operations for the stable storage unit. The controller is configured to determine the locations in the unstable storage that store the pending write information and to selectively write the pending write operations to the stable storage unit when power to the memory unit is interrupted. The energy storage device is electrically coupled with the controller to provide backup power when main power to the memory unit is interrupted.

In some embodiments a computer system includes a processor and a memory unit electrically coupled with the processor. The memory unit includes a stable storage unit, an unstable storage unit, and a controller. The unstable storage unit stores pending write operations for the stable storage unit. The controller is configured to determine the locations in the unstable storage that store the pending write information and to selectively write the pending write operations to the stable storage unit when power to the memory unit is interrupted.

BRIEF DESCRIPTION OF THE DRAWINGS

Advantages of the embodiments disclosed herein will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiments described herein as "exemplary" are not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computing system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computing systems and other functional aspects of a computing system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in the embodiments disclosed herein.

In general, a computer system includes memory that has a non-volatile bulk memory, a volatile front end memory, a controller, and an energy storage device. The energy storage device provides a brief period of data retention to permit "dirty" data to be moved from the unstable volatile memory to the stable non-volatile memory. Data are dirty when the data are pending write operations to the non-volatile memory, but are still located in volatile memory. In the absence of the controller and energy storage device, the pending write data in the volatile memory are lost when power to the memory is interrupted.

Figure 1:
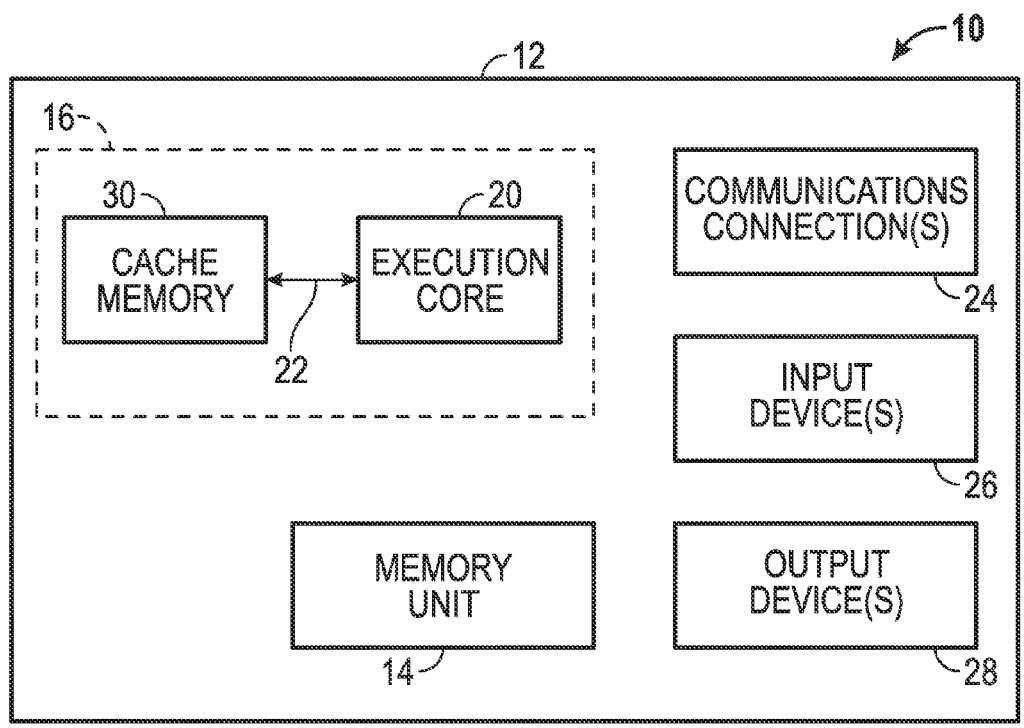
FIG. 1 is a simplified block diagram of a computer system according to some embodiments.

Referring now to FIG. 1, a simplified block diagram is shown illustrating a computer system 10 according to some embodiments. The computer system 10 includes a case or housing 12, memory unit 14, and a processor 16. The computer system 10 may be a desktop computer, laptop computer, server, set top box, motherboard, camera, audio recording device, video recording device, or any other device that includes the processor 16 and the memory unit 14. Additional components such as displays and user input components may be employed without departing from the scope of the present disclosure. The memory unit 14 is a hybrid memory, as will be described below with reference to FIG. 2. The processor 16 includes at least one execution core 20, an interconnect 22, and a cache memory 24. The processor 16 may be a central processor unit, a graphics processing unit, an accelerated processing unit, or any other suitable processor type.

The computer system 10 may also contain communications connection(s) 24 that allow the system to communicate with other devices. In embodiments described herein, communication connection(s) 24 may include, without limitation, suitably configured interfaces that allow computer system 10 to communicate with a network such as the Internet, external databases, external memory devices, and the like. Communications connection(s) 24 may be associated with the handling of communication media as defined above. The computer system 10 may also include or communicate with input device(s) 26 such as a keyboard, mouse or other pointing device, pen, voice input device, touch input device, etc. The computer system 10 may also include or communicate with output device(s) 28 such as a display, speakers, printer, or the like. All of these devices are well known in the art and need not be discussed at length here.

Figure 2:
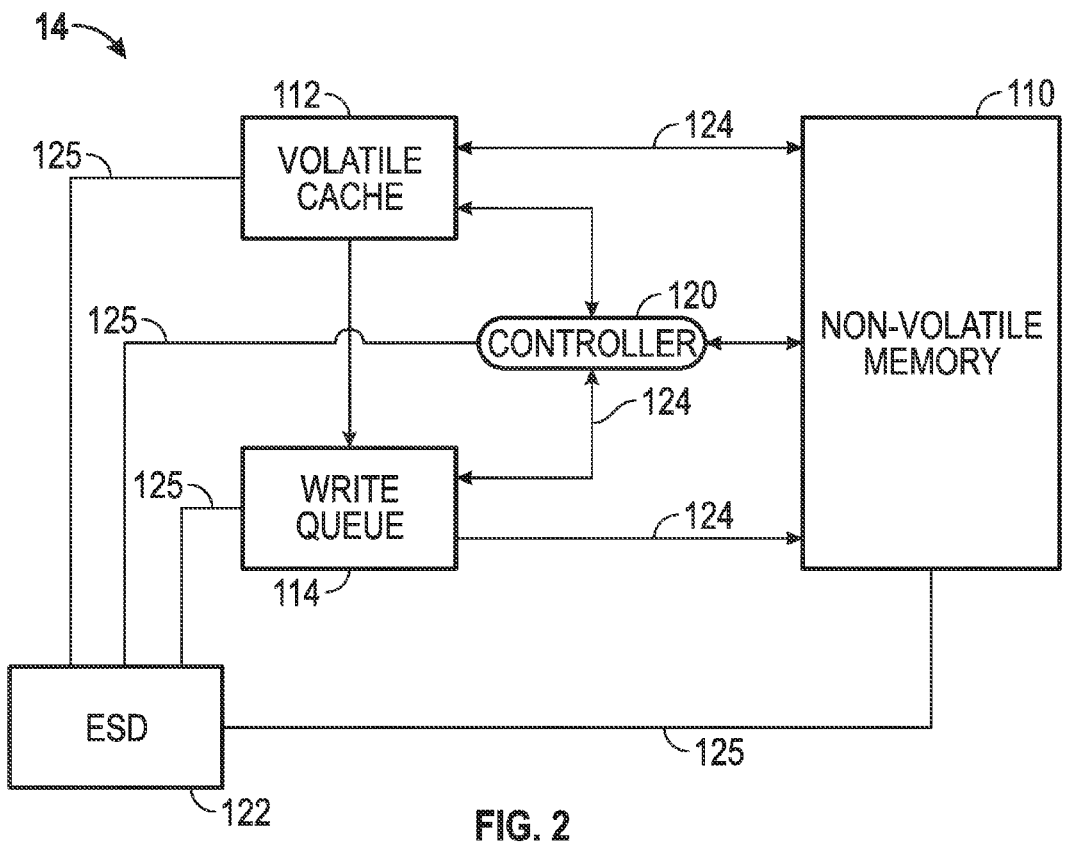
FIG. 2 is a simplified block diagram of a memory unit according to some embodiments.

Referring now to FIG. 2, a simplified block diagram of the memory unit 14 is illustrated according to some embodiments. The memory unit 14 is a system memory or main memory of the computer system 10. The memory unit 14 includes a non-volatile memory 110, a volatile cache 112, a write queue 114, a controller 120, and an energy storage device (ESD) 122. The non-volatile memory 110, the volatile cache 112, the write queue 114, and the controller 120 are electrically coupled for electronic communication by a plurality of interconnects 124. A plurality of power interconnects 125 couple the ESD 122 with the non-volatile memory 110, the volatile cache 112, the write queue 114, and the controller 120 for supplying backup power when main power is interrupted.

The non-volatile memory 110 is a stable storage unit. Stable storage is storage that retains information when power is interrupted. In the example provided, the non-volatile memory 110 is a non-volatile random access memory (NVRAM) that has a large capacity for bulk storage. For example, the non-volatile memory may be flash memory, spin-transfer torque random access memory (STT-RAM), magnetic memory, phase-change memory (PCM), or other stable storage memory media.

The volatile cache 112 is an unstable storage unit. Unstable storage is storage that must be provided with power to retain information. In the example provided the volatile cache 112 is a dynamic random access memory (DRAM) write back cache that acts as a front end to the larger non-volatile memory 110. For example, when data from the processor 16 is sent to the memory unit 14, the data may be stored in the volatile cache 112 before being written to the non-volatile memory 110. The fast read and write times of the volatile cache 112 permit faster reading and writing to the memory unit 14 than when reading and writing directly to the non-volatile memory 110.

The write queue 114 stores information that indicates pending write operations to the non-volatile memory 110. In some embodiments, the write queue 114 stores pointers into the volatile memory that point to information that is pending a write operation to the non-volatile memory 110. With a pointer based write queue 114, the controller 120 writes the information from the pointed to location in the volatile cache 112 to the non-volatile memory 110 when main power is interrupted using power from the ESD 122.

In some embodiments, the write queue 114 is log based and contains information that is pending a write operation to the non-volatile memory 110. For example, the write queue 114 may be a circular queue that contains all of the outstanding write operations in addition to head and tail pointers to define the valid contents of the queue. All writes are sent to the log based write queue 114. In some embodiments, the log based write queue 114 may be implemented with faster writing unstable storage so that the ESD 122 need not provide power to the volatile cache 112.

In some embodiments, the log based write queue may be implemented with a slower writing stable storage unit whose contents are preserved on interruption of main power due to the non-volatility of the stable storage. With a stable log based write queue 114, the controller 120 writes the pending write operations that are still located in the volatile cache 112 to the write queue 114 when main power is interrupted using power from the ESD 122. When power is restored after a power interruption, the controller 120 writes the pending write operations from the stable log based write queue 114 to the non-volatile memory 110.

The controller 120 includes hardware implemented control logic to provide functionality automatically and transparently without increased burdens on software. The control logic may perform the operations illustrated in FIG. 4, as will be described below.

The ESD 122 may be a battery, a supercapacitor, or other suitable energy storage device. An energy capacity of the ESD 122 is preferably no larger than an amount of energy needed to write the dirty portions of the memory unit 14 back to stable storage. For example, with a pointer based write queue 114, the ESD 122 has a capacity that permits the dirty portions of the volatile cache 112 to be written to the non-volatile memory 110. Similarly, with a stable log based write queue 114, the ESD 122 has a capacity that permits the dirty portions of the volatile cache 112 to be written to the write queue 114. By writing only the dirty portions to stable storage, the capacity of the ESD 122 may be smaller than in implementations that write back the entire contents of unstable storage. In some embodiments, the ESD 122 includes an energy storage capacity that is less than a capacity required to write the entire contents of the volatile cache 112 to the non-volatile memory 110. The non-volatile memory 110 does not require refreshing, and therefore power may only need to be supplied to the non-volatile memory 110 for writing operations.

Figure 3:
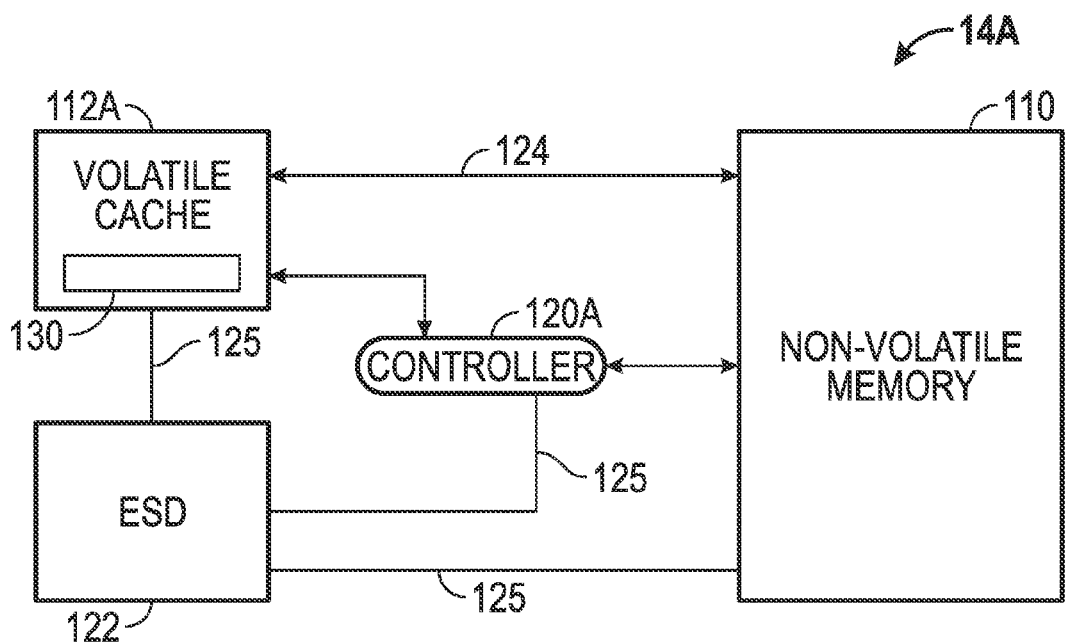
FIG. 3 is a simplified block diagram of a memory unit according to some embodiments.

Referring now to FIG. 3, a memory unit 14A is illustrated according to some embodiments. The memory unit 14A is similar to the memory unit 14, where like numbers refer to like components. The memory unit 14A, however, includes a volatile cache 112A and a controller 120A. The volatile cache 112A includes a plurality of status indicators 130 that are associated with portions of the volatile cache 112A that contain information. The status indicators 130 indicate whether the information stored in the associated portions is pending a write operation to non-volatile memory. In the example provided, the status indicators 130 are bits that may be set or cleared to indicate the pending write operations.

The controller 120A includes control logic to scan the status indicators 130 when main power is interrupted to the memory unit 14A. When a status indicator 130 indicates that the information stored in the associated portion of the volatile cache 112A, the controller 120A writes the information to the non-volatile memory 110 using backup power from the ESD 122 after a power interruption.

Figure 4:
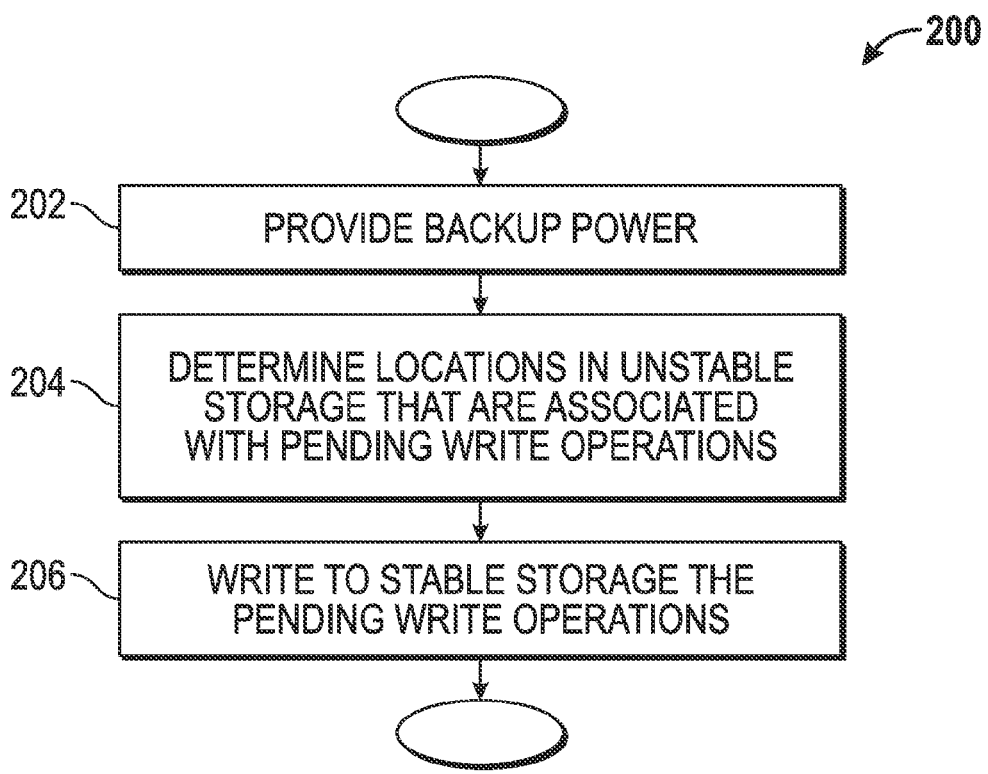
FIG. 4 is a flow diagram illustrating operations according to some embodiments.

Referring now to FIG. 4, operations 200 of the computer system 10 are illustrated in flow diagram form according to some embodiments. Operations 200 are carried out when main power is interrupted to the computer system 10 or to the memory unit 14, 14A. At block 202 backup power is provided by the ESD 122.

At block 204 the locations in unstable storage that are associated with pending write operations to stable storage are determined. For example, the controller 120 may determine the locations in the volatile cache 112 based on pointers stored in the write queue 114. In some embodiments, such as with the memory unit 14A, the controller 120A may read the status indicators 130 to determine the locations.

At block 206 the information stored in the locations that are pending write operations are written to stable storage. For example, with a pointer based write queue 114 the controller 120 may write the information from the volatile cache 112 to the non-volatile memory 110. In some embodiments, such as with a stable log based write queue 114, the controller 120 may write the information from the volatile cache 112 to the stable log based write queue 114.

A data structure representative of the computer system 10 and/or portions thereof included on a computer readable storage medium may be a database or other data structure which can be read by a program and used, directly or indirectly, to fabricate the hardware comprising the computer system 10. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computer system 10. The netlist may then be placed and routed to produce a data set describing geometric shapes to be applied to masks. The masks may then be used in various semiconductor fabrication steps to produce a semiconductor circuit or circuits corresponding to the computer system 10. Alternatively, the database on the computer readable storage medium may be the netlist (with or without the synthesis library) or the data set, as desired, or Graphic Data System (GDS) II data.

The operations illustrated in FIG. 4 may be governed by instructions that are stored in a non-transitory computer readable storage medium and that are executed by at least one processor of a computing system. Each of the operations shown in FIG. 4 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The computer systems provided herein have several beneficial attributes. For example, non-volatile properties of memory may be retained while also benefitting from performance enhancing fast write volatile cache memory. Computer systems may reboot more quickly, more quickly move in and out of "sleep" with non-volatile memory, and burn little or no power when put to sleep. Accordingly, battery life of laptops may be increased.

While at least one exemplary embodiment has been presented in the foregoing detailed description of the disclosed embodiments, it should be appreciated that a vast number of variations exist. It should also be appreciated that the exemplary embodiment or exemplary embodiments are only examples, and are not intended to limit the scope, applicability, or configuration of the disclosed embodiments in any way. Rather, the foregoing detailed description will provide those skilled in the art with a convenient road map for implementing the disclosed embodiments, it being understood that various changes may be made in the function and arrangement of elements of the disclosed embodiments without departing from the scope of the disclosed embodiments as set forth in the appended claims and their legal equivalents.

What is claimed is:

1. A memory unit comprising:
a stable storage unit;
an unstable storage unit that stores pending write operations for the stable storage unit;
a set of status indicators, each status indicator associated with a corresponding portion of the unstable storage unit, wherein each status indicator is configured to be set to indicate whether the information stored in the corresponding portion includes a pending write operation; and
a controller configured to, when power to the memory unit is interrupted:
scan the corresponding status indicator to determine whether each portion of the unstable storage unit includes a pending write operation;
identify, based on the scan, particular locations in the unstable storage unit that store the pending write operations; and
selectively write the pending write operations to the stable storage unit, the selectively writing comprising writing data to the stable storage unit only from the particular locations in the unstable storage unit.

2. The memory unit of claim 1 further comprising an energy storage device electrically coupled with the controller to provide backup power when power to the memory unit is interrupted.

3. The memory unit of claim 2 further including a write queue for indicating the pending write operations, the write queue storing the status indicators.

4. The memory unit of claim 3 wherein the stable storage unit is a non-volatile bulk memory and the unstable storage unit is a volatile cache for the non-volatile bulk memory.

5. The memory unit of claim 4 wherein the write queue stores pointers into the volatile cache that indicate information associated with the pending write operations.

6. The memory unit of claim 3 wherein the write queue is log based and stores information associated with the pending write operations.

7. The memory unit of claim 2 wherein the energy storage device includes an energy storage capacity that is less than a capacity required to write the entire contents of the unstable storage unit to the stable storage unit.

8. The memory unit of claim 1 further including a non-volatile bulk memory, and wherein the unstable storage unit is a volatile cache for the non-volatile bulk memory, and wherein the stable storage unit is a log based write queue that stores the pending write operations to be written again to the non-volatile bulk memory.

9. A memory unit comprising:
a stable storage unit;
a volatile cache that stores pending write operations for the stable storage unit;
a set of status indicators, each status indicator associated with a corresponding portion of the volatile cache, wherein each status indicator is configured to be set to indicate whether the information stored in the corresponding portion includes a pending write operation; and a controller configured to, when power to the memory unit is interrupted:
scan the corresponding status indicator to determine whether each portion of the volatile cache includes a pending write operation;
identify, based on the scan, particular locations in the volatile cache that store the pending write operations; and
selectively write the pending write operations to the stable storage unit, the selectively writing comprising writing data to the stable storage unit only from the particular locations in the volatile cache; and an energy storage device electrically coupled with the controller to provide backup power when power to the memory unit is interrupted.

10. The memory unit of claim 9 further including a write queue for indicating the pending write operations, wherein the stable storage unit is a non-volatile bulk memory and wherein the write queue stores the status indicators.

11. The memory unit of claim 10 wherein the write queue stores pointers into the volatile cache that indicate information associated with the pending write operations.

12. The memory unit of claim 10 wherein the write queue is log based and stores information associated with the pending write operations.

13. The memory unit of claim 9 wherein the energy storage device includes an energy storage capacity that is less than a capacity required to write the entire contents of the volatile cache to the stable storage unit.

14. The memory unit of claim 9 further including a non-volatile bulk memory, wherein the stable storage unit is a log based write queue that stores the pending write operations to be written again to the non-volatile bulk memory.

15. A computer system comprising:
a processor; and
a memory unit electrically coupled with the processor, the memory unit comprising:
a stable storage unit;
an unstable storage unit that stores pending write operations for the stable storage unit;
a set of status indicators, each status indicator associated with a corresponding portion of the unstable storage unit, wherein each status indicator is configured to be set to indicate whether the information stored in the corresponding portion includes a pending write operation; and
a controller configured to, when power to the memory unit is interrupted:
identify, based on the scan, particular locations in the unstable storage unit that store the pending write operations; and
selectively write the pending write operations to the stable storage unit, the selectively writing comprising writing data to the stable storage unit only from the particular locations in the unstable storage unit.

16. The computer system of claim 15 wherein the memory unit further includes an energy storage device electrically coupled with the controller to provide backup power when power to the memory unit is interrupted.

17. The computer system of claim 16 wherein the memory unit further includes a write queue for indicating the pending write operations, the write queue storing the status indicators.

18. The computer system of claim 17 wherein the stable storage unit is a non-volatile bulk memory and the unstable storage unit is a volatile cache for the non-volatile bulk memory.

19. The computer system of claim 18 wherein the write queue stores pointers into the volatile cache that indicate information associated with the pending write operations.

20. The computer system of claim 16 wherein the energy storage device includes an energy storage capacity that is less than a capacity required to write the entire contents of the unstable storage unit to the stable storage unit.

21. The computer system of claim 15 wherein the memory unit further includes a non-volatile bulk memory, and wherein the unstable storage unit is a volatile cache for the non-volatile bulk memory, and wherein the stable storage unit is a log based write queue that stores the pending write operations to be written again to the non-volatile bulk memory.

* * * * *